US012366329B2

(12) United States Patent
Kim

(10) Patent No.: US 12,366,329 B2
(45) Date of Patent: Jul. 22, 2025

(54) FLUID DISTRIBUTING APPARATUS AND FLUID FILLING SYSTEM FOR VEHICLE INCLUDING THE SAME

(71) Applicants: Hyundai Motor Company, Seoul (KR); Kia Corporation, Seoul (KR)

(72) Inventor: Gyu Won Kim, Yongin-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 35 days.

(21) Appl. No.: 18/467,136

(22) Filed: Sep. 14, 2023

(65) Prior Publication Data

US 2024/0353065 A1 Oct. 24, 2024

(30) Foreign Application Priority Data

Apr. 19, 2023 (KR) ........................ 10-2023-0051497

(51) Int. Cl.
*F17C 5/00* (2006.01)

(52) U.S. Cl.
CPC ...... *F17C 5/007* (2013.01); *F17C 2205/0326* (2013.01); *F17C 2205/0335* (2013.01); *F17C 2205/0338* (2013.01); *F17C 2205/0352* (2013.01); *F17C 2221/012* (2013.01); *F17C 2250/043* (2013.01); *F17C 2250/0636* (2013.01); *F17C 2265/065* (2013.01); *F17C 2270/0168* (2013.01); *F17C 2270/0184* (2013.01)

(58) Field of Classification Search
CPC .............. F17C 5/007; F17C 2205/0326; F17C 2205/0335; F17C 2205/0338; F17C 2205/0352; F17C 2221/012; F17C 2250/043; F17C 2250/0636; F17C 2265/065; F17C 2270/0168; F17C 2270/0184
USPC .......................................................... 141/192
See application file for complete search history.

(56) References Cited

U.S. PATENT DOCUMENTS

| | | | | |
|---|---|---|---|---|
| 4,213,476 | A | 7/1980 | Bresie et al. | |
| 4,380,242 | A * | 4/1983 | Bresie | F17C 13/045 137/565.13 |
| 8,443,820 | B2 * | 5/2013 | Ulrey | F02D 19/027 141/2 |
| 11,255,484 | B2 | 2/2022 | Thibaut | |

(Continued)

FOREIGN PATENT DOCUMENTS

| | | | |
|---|---|---|---|
| EP | 3470252 | A1 | 4/2019 |
| JP | 2003269255 | A | 9/2003 |

(Continued)

*Primary Examiner* — Craig M Schneider
*Assistant Examiner* — Christopher M Afful
(74) *Attorney, Agent, or Firm* — SLATER MATSIL, LLP

(57) ABSTRACT

An embodiment fluid filling system for a vehicle includes a first receptacle, a second receptacle, a fluid distributing apparatus connected to the first receptacle and the second receptacle, the fluid distributing apparatus being configured to adjust a flow rate of a first fluid discharged from the first receptacle and a flow rate of a second fluid discharged from the second receptacle, and a fluid introducing part connected to the fluid distributing apparatus and configured to receive the first fluid and the second fluid discharged from the fluid distributing apparatus.

15 Claims, 7 Drawing Sheets

(56) References Cited

U.S. PATENT DOCUMENTS

| | | | | |
|---|---|---|---|---|
| 2012/0031525 | A1* | 2/2012 | Wonders | F17C 5/002<br>141/94 |
| 2013/0008557 | A1* | 1/2013 | Cohen | G05D 11/132<br>141/105 |
| 2014/0124039 | A1* | 5/2014 | Bartlok | F17C 5/06<br>138/26 |
| 2020/0149684 | A1* | 5/2020 | Bernhardt | F17C 6/00 |
| 2021/0218043 | A1* | 7/2021 | Ardanese | F16K 37/005 |
| 2021/0239270 | A1 | 8/2021 | Birdsall | |
| 2021/0356079 | A1 | 11/2021 | He et al. | |
| 2022/0123332 | A1* | 4/2022 | Green | F17C 13/02 |
| 2022/0193600 | A1* | 6/2022 | Maehara | B01D 53/0407 |

FOREIGN PATENT DOCUMENTS

| | | | |
|---|---|---|---|
| JP | 2011236930 | A | 11/2011 |
| JP | 2016081724 | A | 5/2016 |
| JP | 2021196051 | A | 12/2021 |
| JP | 2022059411 | A | 4/2022 |
| KR | 101192885 | B1 | 10/2012 |

* cited by examiner

FLUID DISTRIBUTING APPARATUS AND FLUID FILLING SYSTEM FOR VEHICLE INCLUDING THE SAME

CROSS-REFERENCE TO RELATED APPLICATIONS

This application claims the benefit of Korean Patent Application No. 10-2023-0051497, filed on Apr. 19, 2023, which application is hereby incorporated herein by reference.

TECHNICAL FIELD

The present disclosure relates to a fluid distributing apparatus and a fluid filling system including the same.

BACKGROUND

In general, a hydrogen fuel cell electric vehicle (FCEV) electrochemically generates electricity by using oxygen and hydrogen in a stack to directly change chemical energy of a fuel into electric energy and uses it as a power source. The fuel cell electric vehicle is an ideal technology that may continuously generate electric power regardless of a capacity of a fuel cell by supplying a fuel and air from an outside and thus rarely discharges contaminants while exhibiting high efficiency.

However, a current filling system for filling a fuel in a fuel cell electric vehicle has an insufficient filling infrastructure and requires high construction and management costs for a hydrogen filling station, and thus, is late to enter the market as compared with an electric vehicle. Accordingly, it is an important problem to manage the hydrogen filling system more efficiently and construct an economical filling infrastructure.

In particular, to receive a fuel through a plurality of passages for rapid filling, a fuel cell electric vehicle having a plurality of receptacles has been developed. Then, because the hydrogen discharged from the plurality of receptacles is introduced into a manifold or a tank, a filling performance of one side is degraded when a pressure of the other one is excessively high.

SUMMARY

Embodiments of the present disclosure can solve problems occurring in the prior art while advantages achieved by the prior art are maintained intact.

An embodiment of the present disclosure provides a fluid distributing apparatus that may make a flow rate of a fuel discharged toward a storage part after being introduced from a plurality of receptacles uniform and a fluid filling system for a vehicle including the same.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a fluid filling system for a vehicle includes a first receptacle into which a first fluid is introduced, a second receptacle into which a second fluid is introduced, a fluid introducing part through which the first fluid introduced into the first receptacle and the second fluid introduced into the second receptacle are introduced, and a fluid distributing apparatus connecting the first receptacle, the second receptacle, and the fluid introducing part and that adjusts a flow rate of the first fluid and a flow rate of the second fluid.

In another example, the fluid distributing apparatus may include a first introduction passage connected to the first receptacle and through which the first fluid is introduced along a first direction, a second introduction passage connected to the second receptacle and through which the second fluid is introduced along a second direction, a discharge passage through which the first fluid introduced through the first introduction passage and the second fluid introduced through the second introduction passage are discharged, and a flow rate adjusting part disposed between the first introduction passage and the second introduction passage and the discharge passage and that adjusts a flow rate of at least any one of the first fluid and the second fluid.

In another example, the discharge passage may include a first discharge passage connected to the first introduction passage and a second discharge passage connected to the second introduction passage.

In another example, the flow rate adjusting part may include a first valve disposed in the first introduction passage that adjusts the flow rate of the first fluid and a second valve disposed in the second introduction passage that adjusts the flow rate of the second fluid.

In another example, the fluid filling system may further include a controller electrically connected to the first valve and the second valve that controls opening and closing of the first valve and the second valve, and the controller may control opening degrees of the first valve and the second valve based on a pressure of the first fluid in the first introduction passage and a pressure of the second fluid in the second introduction passage.

In another example, the controller may perform at least one of an operation of decreasing the opening degree of the first valve or an operation of increasing the opening degree of the second valve when the pressure of the first fluid is higher than the pressure of the second fluid.

In another example, the flow rate adjusting part may further include a connection passage connecting the first introduction passage and the second introduction passage and a differential pressure measuring part disposed in the connection passage that acquires a differential pressure of the first fluid and the second fluid in the connection passage, and the controller may control the opening degrees of the first valve and the second valve based on the differential pressure of the first fluid and the second fluid, which is acquired by the differential pressure measuring part.

In another example, the flow rate adjusting part may further include a first pressure measuring part disposed at one point of the first valve in the first introduction passage that measures a pressure in the first introduction passage and a second pressure measuring part disposed at one point of the second valve in the second introduction passage that measures a pressure in the second introduction passage, and the controller may control the opening degrees of the first valve and the second valve based on the pressure in the first introduction passage, which is acquired by the first pressure measuring part, and the pressure in the second introduction passage, which is acquired by the second pressure measuring part.

In another example, the first valve and the second valve may be flow rate control valves.

In another example, the first valve and the second valve may be solenoid valves.

In another example, the flow rate adjusting part may further include a first check valve disposed between the first introduction passage and the first discharge passage that prevents reverse flows of the first fluid and a second check valve disposed between the second introduction passage and the second discharge passage that prevents reverse flows of the second fluid.

In another example, the flow rate adjusting part may be a shuttle valve connected to an end of the first introduction passage in the first direction and an end of the second introduction passage in the second direction.

In another example, the fluid introducing part may include a manifold connected to the fluid distributing apparatus and a storage tank connected to the manifold.

In another example, the fluid introducing part may further include a regulator connected to the manifold that reduces a pressure of a discharge fluid discharged from the manifold and a battery connected to the regulator.

According to another embodiment of the present disclosure, a fluid distributing apparatus includes a first introduction passage, through which a first fluid is introduced in a first direction, a second introduction passage, through which a second fluid is introduced in a second direction, a discharge passage, through which the first fluid introduced through the first introduction passage and the second fluid introduced through the second introduction passage are discharged, and a flow rate adjusting part disposed between the first introduction passage and the second introduction passage and the discharge passage that adjusts a flow rate of at least any one of the first fluid and the second fluid.

BRIEF DESCRIPTION OF THE DRAWINGS

The above and other objects, features, and advantages of embodiments of the present disclosure will be more apparent from the following detailed description taken in conjunction with the accompanying drawings, in which:

FIG. 5 is a view illustrating that a first valve and a second valve are solenoid valves in

FIG. 4;

DETAILED DESCRIPTION OF ILLUSTRATIVE EMBODIMENTS

Figure 1:
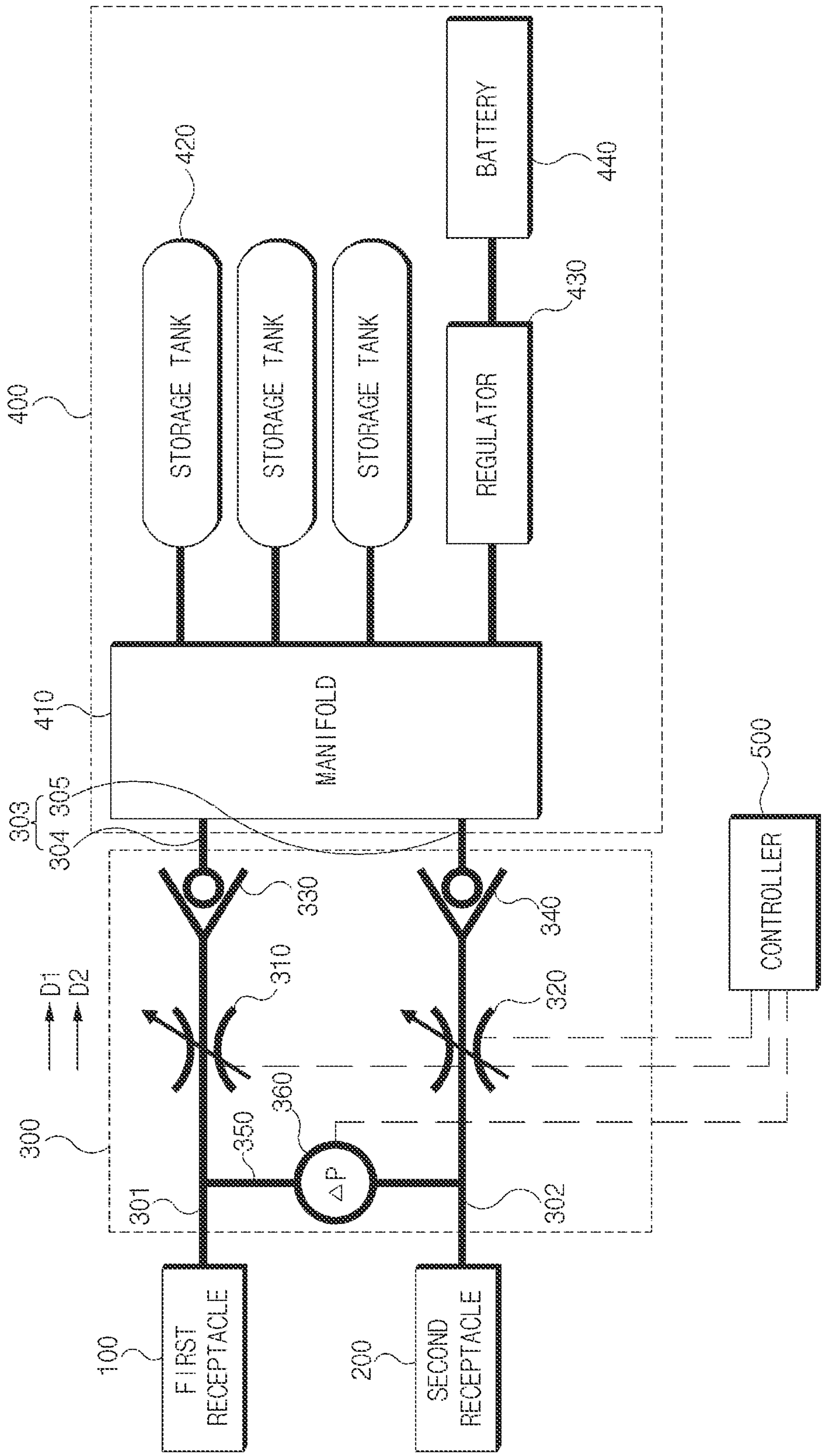
FIG. 1 is a view illustrating a fluid filling system for a vehicle according to a first embodiment of the present disclosure.

Hereinafter, some embodiments of the present disclosure will be described in detail with reference to exemplary drawings. In adding reference numerals to the components of the drawings, the same components will be denoted by the same reference numerals as much as possible even when they are shown in different drawings. Furthermore, in describing the embodiments of the present disclosure, a detailed description of related known configurations or functions will be omitted when it is determined that the detailed description thereof may make understanding of the embodiments of the present disclosure unclear.

A fluid filling system according to embodiments of the present disclosure may be a fluid filling system for a vehicle that is used for a transportation means that employs a hydrogen fuel battery, but embodiments of the present disclosure are not limited thereto, and any system that has a receptacle for receiving a fluid and a fluid storage part, in which a fluid introduced through the receptacle is stored, may be applied with no limitation. FIG. 1 is a view illustrating a fluid filling system for a vehicle according to a first embodiment of the present disclosure.

A fluid filling system for a vehicle according to embodiments of the present disclosure may include a first receptacle 100, a second receptacle 200, a fluid introducing part 400, and a fluid distributing apparatus 300. The first receptacle 100 may be a configuration, through which a first fluid is introduced. The second receptacle 200 may be a configuration through which a second fluid is introduced. Here, the first fluid and the second fluid may be fuels. As an example, the first fluid and the second fluid may be hydrogen. However, the first fluid and the second fluid do not necessarily need to be the same kind of fluid.

The fluid introducing part 400 may be a configuration that is configured such that the first fluid introduced into the first receptacle 100 and the second fluid introduced into the second receptacle 200 are introduced therethrough. As an example, the fluid introducing part 400 may include a manifold 410 and a storage tank 420. Then, a plurality of storage tanks 420 may be provided and may be connected to the manifold 410.

Figure 2:
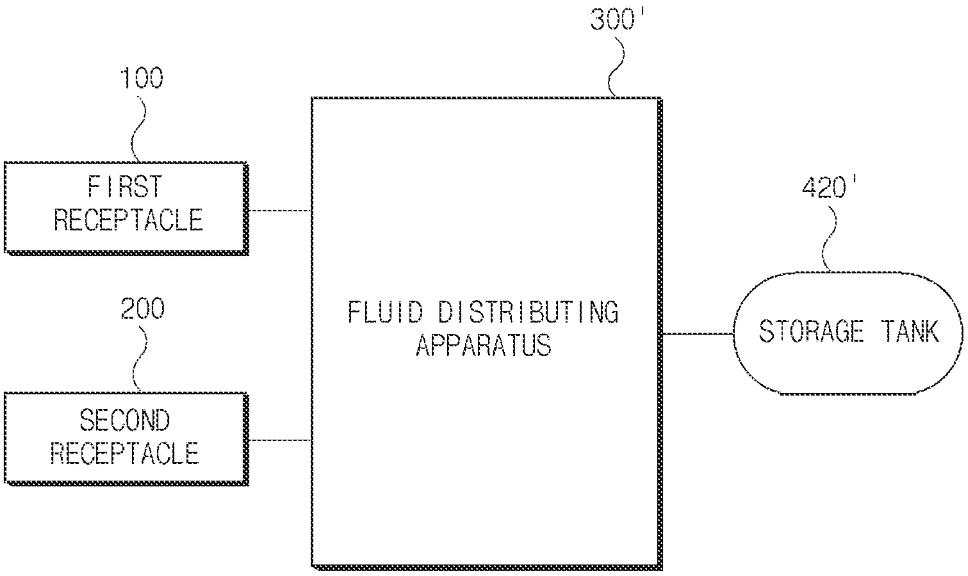
FIG. 2 is a view illustrating that a fluid introducing part is a single storage tank.

As another example, the fluid introducing part 400 may be a single storage tank 420'. FIG. 2 is a view illustrating that the fluid introducing part is a single storage tank. Then, the fluid distributing apparatus 300' may be connected to the single storage tank 420'.

The fluid introducing part 400 may further include a regulator 430 and a battery 440. The regulator 430 may be connected to the manifold 410 and may be configured to reduce a pressure of a discharge fluid that is discharged from the manifold 410. The battery 440 may be connected to the regulator 430. The discharge fluid, which is discharged from the regulator 430 while the pressure thereof is reduced, may be introduced into the battery 440. The battery 440 may be a fuel cell. The regulator 430 and the battery 440 may be connected to each other through a middle-pressure pipeline.

The fluid distributing apparatus 300 may connect the first receptacle 100, the second receptacle 200, and the fluid introducing part 400. The fluid distributing apparatus 300 may be configured to adjust a flow rate of the first fluid and a flow rate of the second fluid.

Hereinafter, the fluid distributing apparatus 300 will be described in detail.

The fluid distributing apparatus 300 may include a first introduction passage 301, a second introduction passage 302, a discharge passage 303, and a flow rate adjusting part. The first introduction passage 301 may be connected to the first receptacle 100 and the first fluid may be introduced therethrough along a first direction D1. The second introduction passage 302 may be connected to the second receptacle 200 and the second fluid may be introduced therethrough along a second direction D2. The discharge passage 303 may be configured such that the first fluid introduced through the first introduction passage 301 and the second fluid introduced through the second introduction passage 302 are discharged therethrough.

The flow rate adjusting part may be disposed between the first introduction passage 301, the second introduction passage 302, and the discharge passage 303, and may be configured to adjust a flow rate of at least any one of the first fluid and the second fluid. The flow rate adjusting part may have various forms. The flow rate adjusting part may be any one configuration or may be a set of several configurations. Hereinafter, fluid distributing apparatuses having various examples of flow rate adjusting parts will be described in detail.

First Embodiment

The flow rate adjusting part of the fluid filling system for a vehicle according to the first embodiment includes a differential pressure measuring part 360. Hereinafter, a fluid filling system according to the first embodiment will be further described in detail.

The discharge passage 303 may include a first discharge passage 304 and a second discharge passage 305. The first discharge passage 304 may be connected to the first introduction passage 301. The second discharge passage 305 may be connected to the second introduction passage 302. Both of the first discharge passage 304 and the second discharge passage 305 may be connected to the fluid introducing part 400.

Figure 3:
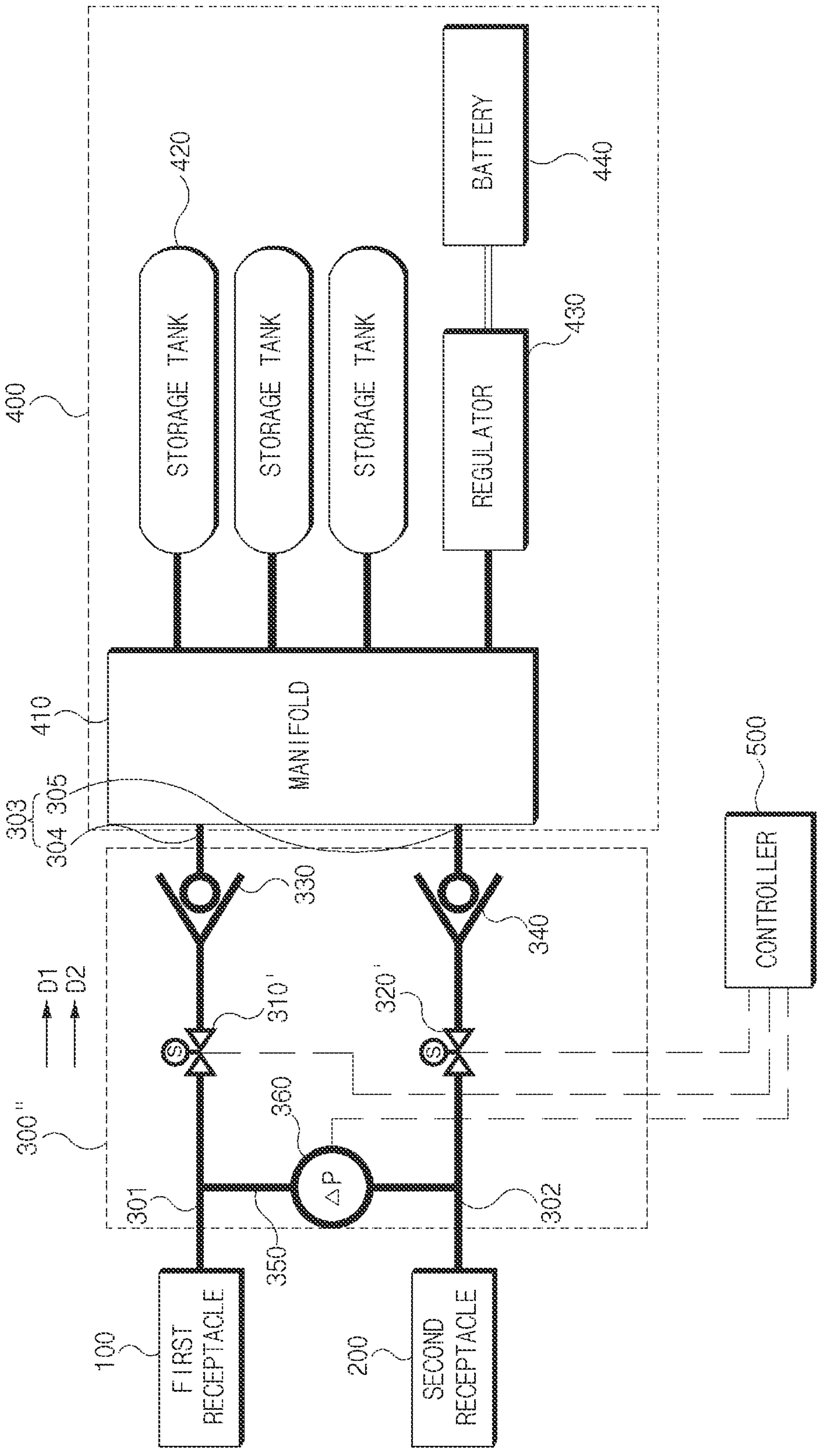
FIG. 3 is a view illustrating that a first valve and a second valve are solenoid valves in FIG. 1.

The flow rate adjusting part may further include a first valve 310 and a second valve 320. The first valve 310 may be disposed in the first introduction passage 301 and may be configured to adjust the flow rate of the first fluid. The second valve 320 may be disposed in the second introduction passage 302 and may be configured to adjust the flow rate of the second fluid. As an example, as illustrated in FIG. 1, the first valve 310 and the second valve 320 may be flow control valves. As another example, a first valve 310' and a second valve 320' may be solenoid valves. FIG. 3 is a view illustrating that the first valve and the second valve in FIG. 1 are solenoid valves.

However, the first valve 310 and the second valve 320 do not necessarily need to be the same kind of valve and may be variously modified as long as the flow rate of the fluid may be adjusted.

The flow rate adjusting part may include a first check valve 330 and a second check valve 340. The first check valve 330 may be disposed between the first introduction passage 301 and the first discharge passage 304 and may be configured to prevent reverse flows of the first fluid. More preferably, the first check valve 330 may be disposed between the first valve 310 and the first discharge passage 304.

The second check valve 340 may be disposed between the second introduction passage 302 and the second discharge passage 305 and may be configured to prevent reverse flows of the second fluid. More preferably, the second check valve 340 may be disposed between the second valve 320 and the second discharge passage 305.

The fluid filling system for a vehicle may further include a controller 500. The controller 500 may be electrically connected to the first valve 310 and the second valve 320 and may be configured to control opening and closing of the first valve 310 and the second valve 320. The controller 500 may include a processor and a memory. The processor may include a microprocessor, such as a field programmable gate array (FPGA), an application specific integrated circuit (ASIC), and a central processing unit. The memory may store control instructions that are bases for generating commands for determining whether the first valve 310 and the second valve 320 are opened or closed by the processor. The memory may be data storage, such as a hard disk drive (HDD), a solid state drive (SSD), a volatile memory, and a nonvolatile memory.

For reference, FIG. 1 illustrates that the controller 500 is connected to the first valve 310, the second valve 320, and the differential pressure measuring part 360 that will be described below, but the electrical connections of the controller 500 and the other components are not limited thereto, and various controls may be performed.

For example, the controller 500 may be electrically connected to an IR emitter of the first receptacle 100 or the second receptacle 200. The IR emitter sends an infrared signal to an IR receiver of a hydrogen filling nozzle. Then, the controller may acquire information, such as a capacity of the storage tank 420, a type of the receptacle, a pressure of the storage tank 420, and a temperature of the storage tank 420, and may deliver the information to the IR emitter. The IR emitter may send the information acquired through the nozzle that is inserted into the receptacle to a hydrogen filling site.

As another example, the controller 500 may control opening and closing of the receptacle. As an example, when it is considered that it is not necessary to introduce the fluid through the first receptacle 100, the controller 500 may close the first receptacle 100.

As another example, the controller 500 may acquire a pressure in the manifold 410 and a pressure in the regulator 430. To achieve this, the controller may be electrically connected to a high pressure sensor connected to the manifold 410 and a middle pressure sensor connected to the regulator 430. Through this, the controller 500 may recognize whether the pressure of the fluid, the pressure of which is reduced by the regulator 430, is proper, and may allow the fluid, the pressure of which is reduced, to be sent from the regulator 430 to the battery 440.

The controller 500 may control opening degrees of the first valve 310 and the second valve 320 based on the pressure of the first fluid in the first introduction passage 301 and the pressure of the second fluid in the second introduction passage 302. As an example, the controller 500 may perform at least any one of an operation of decreasing the opening degree of the first valve 310 and an operation of increasing the opening degree of the second valve 320 when the pressure of the first fluid is higher than the pressure of the second fluid. As another example, the controller 500 may perform at least any one of an operation of increasing the opening degree of the first valve 310 and an operation of decreasing the opening degree of the second valve 320 when the pressure of the first fluid is lower than the pressure of the second fluid.

The flow rate adjusting part may further include a connection passage 350 and the differential pressure measuring part 360. The connection passage 350 may be a passage that connects the first introduction passage 301 and the second introduction passage 302. As an example, the connection passage 350 may connect one point between the first receptacle 100 and the first valve 310 and one point between the second receptacle 200 and the second valve 320. In this way, when the connection passage 350 is formed, a differential pressure of the fluids introduced through the first receptacle 100 and the second receptacle 200 on an upstream side of the first valve 310 and the second valve 320 may be determined in advance for a measure.

As another example, the connection passage 350 may connect one point between the first valve 310 and the first check valve 330 and one point between the second valve 320 and the second check valve 340.

The differential pressure measuring part 360 may be disposed in the connection passage 350 and may be configured to acquire the differential pressure of the first fluid and the second fluid that are present in the connection passage 350. Here, the differential pressure between the first fluid and the second fluid may be a difference between the pressure of the first fluid and the pressure of the second fluid. As an example, when the differential pressure is a positive value, it may mean that the pressure of the first fluid is higher than the pressure of the second fluid. When the differential pressure is a negative value, it may mean that the pressure of the first fluid is lower than the pressure of the second fluid.

The controller 500 may control the opening degrees of the first valve 310 and the second valve 320 based on the differential pressure of the first fluid and the second fluid, which is acquired by the differential pressure measuring part 360. As an example, when the differential pressure of the first fluid and the second fluid, which is acquired by the differential pressure measuring part 360, is a positive value, the controller 500 may perform at least any one of an operation of decreasing the opening degree of the first valve 310 or an operation of increasing the opening degree of the second valve 320.

When the differential pressure of the first fluid and the second fluid, which is acquired by the differential pressure measuring part 360 is a negative value, the controller 500 may perform at least any one of an operation of increasing the opening degree of the first valve 310 or an operation of decreasing the opening degree of the second valve 320.

In the first embodiment, during dual filling using a control based on the differential pressure of the first fluid and the second fluid, which is acquired by the differential pressure measuring part 360, the flow rate of the fluid that is dually filled may be derived to be the same, and thus a filling efficiency may be increased.

Second Embodiment

Figure 4:
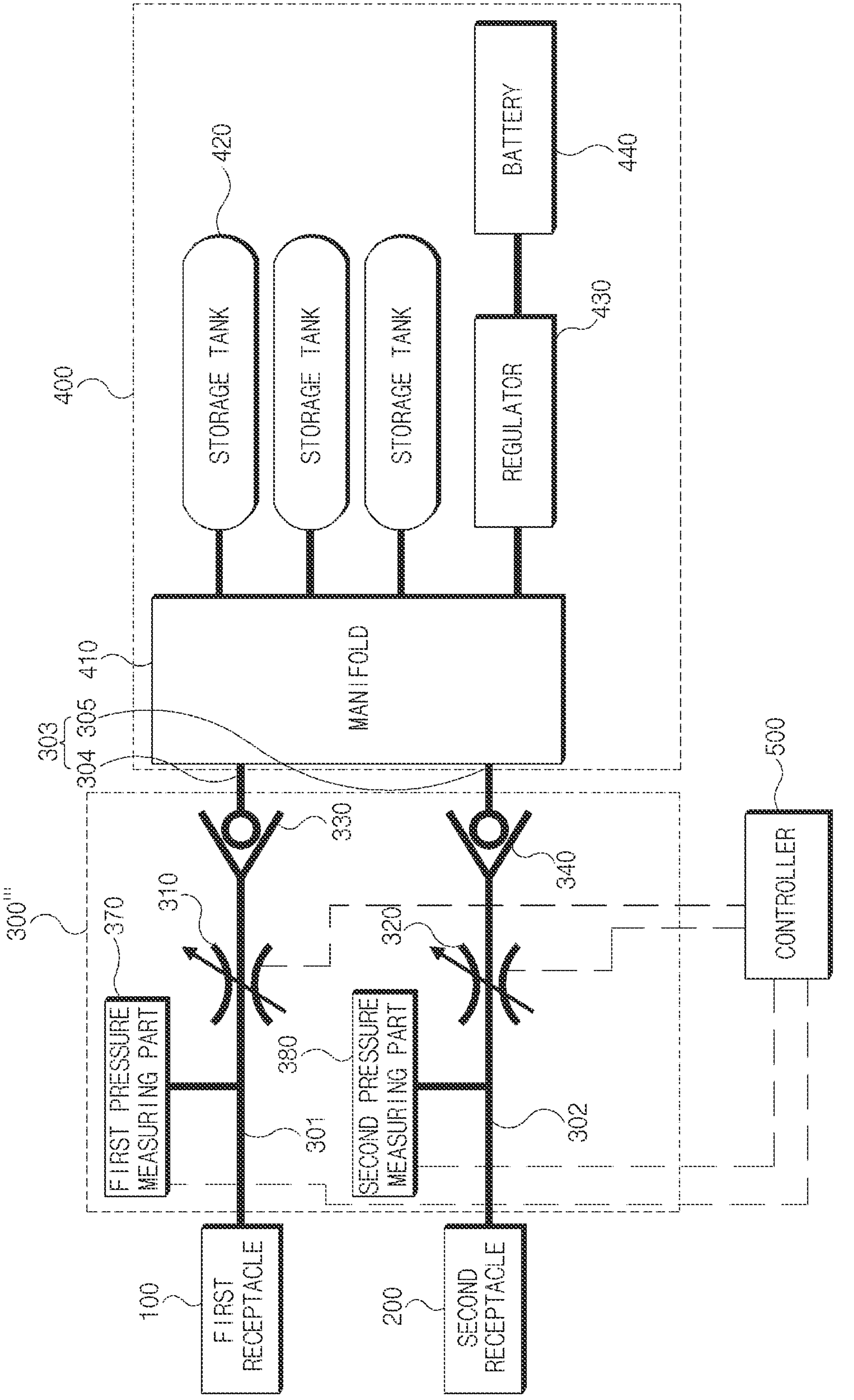
FIG. 4 is a view illustrating a fluid filling system for a vehicle according to a second embodiment of the present disclosure.
Figure 5:
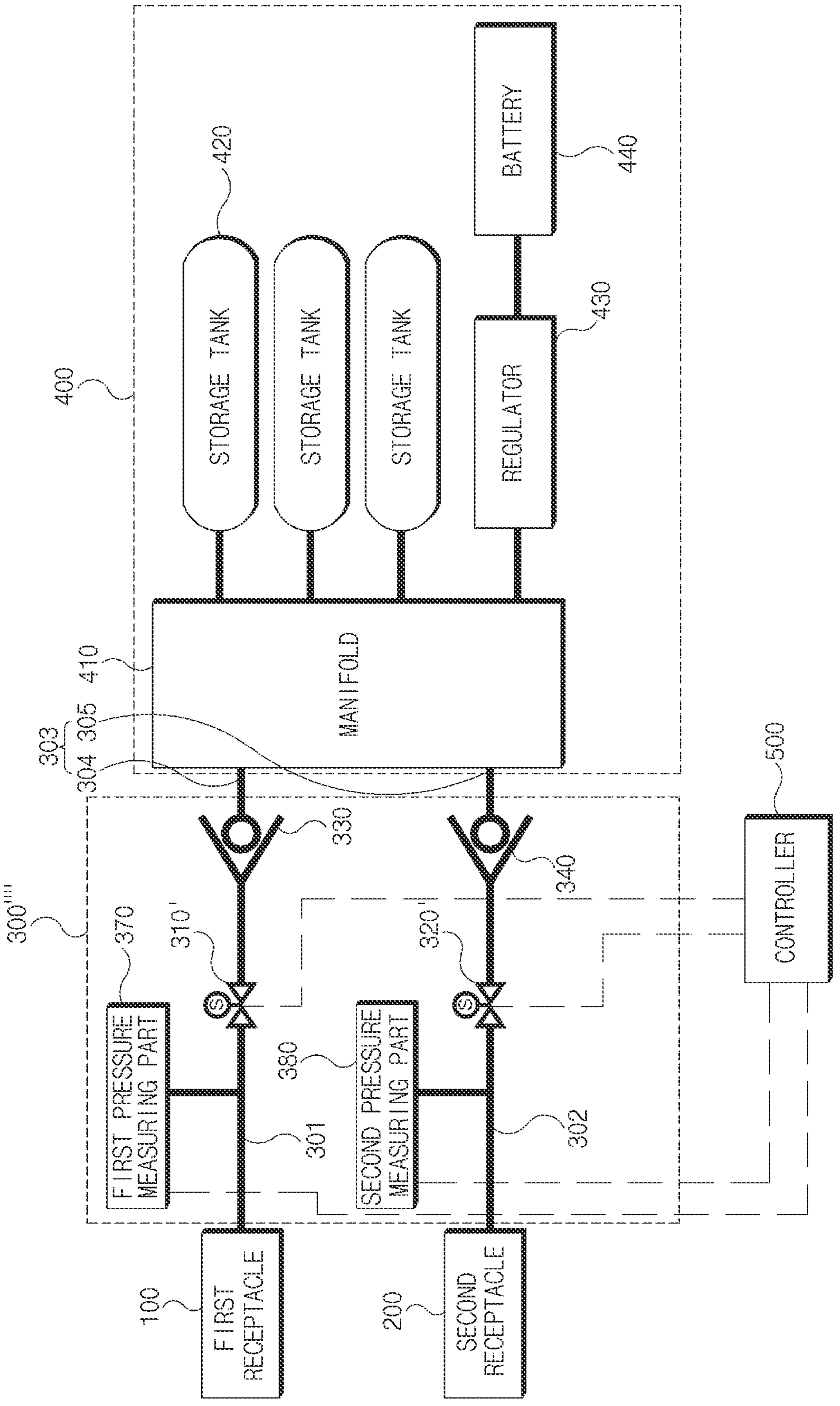

FIG. 4 is a view illustrating a fluid filling system for a vehicle according to a second embodiment of the present disclosure. FIG. 5 is a view illustrating that the first valve and the second valve in FIG. 4 are solenoid valves.

A flow rate adjusting part of a fluid filling system for a vehicle according to the second embodiment includes a first pressure measuring part 370 and a second pressure measuring part 380 instead of the connection passage 350 and the differential pressure measuring part 360 of the first embodiment. Hereinafter, a fluid distributing apparatus 300''' and 300'' including the flow rate adjusting part according to the second embodiment of the present disclosure will be described with reference to FIGS. 4 and 5. The same or corresponding configurations of the fluid distributing apparatus 300 including the flow rate adjusting part according to the first embodiment will be denoted by the same or corresponding reference numerals, and a detailed description thereof will be omitted.

The flow rate adjusting part of the second embodiment may include the first pressure measuring part 370 and the second pressure measuring part 380. The first pressure measuring part 370 may be disposed at one point in the first introduction passage 301 and may be configured to measure a pressure in the first introduction passage 301. As an example, as illustrated in FIG. 4, the first pressure measuring part 370 may be disposed at one point of the first introduction passage 301, which is located on an upstream side of the first valve 310. In the above disposition, a pressure may be measured in advance on an upstream side of the first valve 310, and then, the flow rate may be controlled through the first valve 310.

As another example, the first pressure measuring part 370 may be disposed at one point of the first introduction passage 301, which is located on a downstream side of the first valve 310.

The second pressure measuring part 380 may be disposed at one point in the second introduction passage 302 and may be configured to measure a pressure in the second introduction passage 302. As an example, as illustrated in FIG. 4, the second pressure measuring part 380 may be disposed at one point of the second introduction passage 302, which is located on an upstream side of the second valve 320. In the above disposition, a pressure may be measured in advance on an upstream side of the second valve 320, and then, a flow rate may be controlled through the second valve 320.

As another example, the second pressure measuring part 380 may be disposed at one point of the second introduction passage 302, which is located on a downstream side of the second valve 320.

The controller 500 may control the opening degrees of the first valve 310 and the second valve 320 based on the pressure in the first introduction passage 301, which is acquired by the first pressure measuring part 370, and the pressure in the second introduction passage 302, which is acquired by the second pressure measuring part 380. As an example, when the pressure in the first introduction passage 301, which is acquired by the first pressure measuring part 370, is higher than the pressure in the second introduction passage 302, which is acquired by the second pressure measuring part 380, the controller 500 may perform at least any one of an operation of decreasing the opening degree of the first valve 310 or an operation of increasing the opening degree of the second valve 320.

In the second embodiment, because the flow rates of the fluids that is dually filled during dual filling using a control based on the pressure of the first introduction passage 301, which is acquired by the first pressure measuring part 370, and the pressure of the second introduction passage 302, which is acquired by the second pressure measuring part 380, may be derived to be the same, a filling efficiency may be increased.

Third Embodiment

Figure 6:
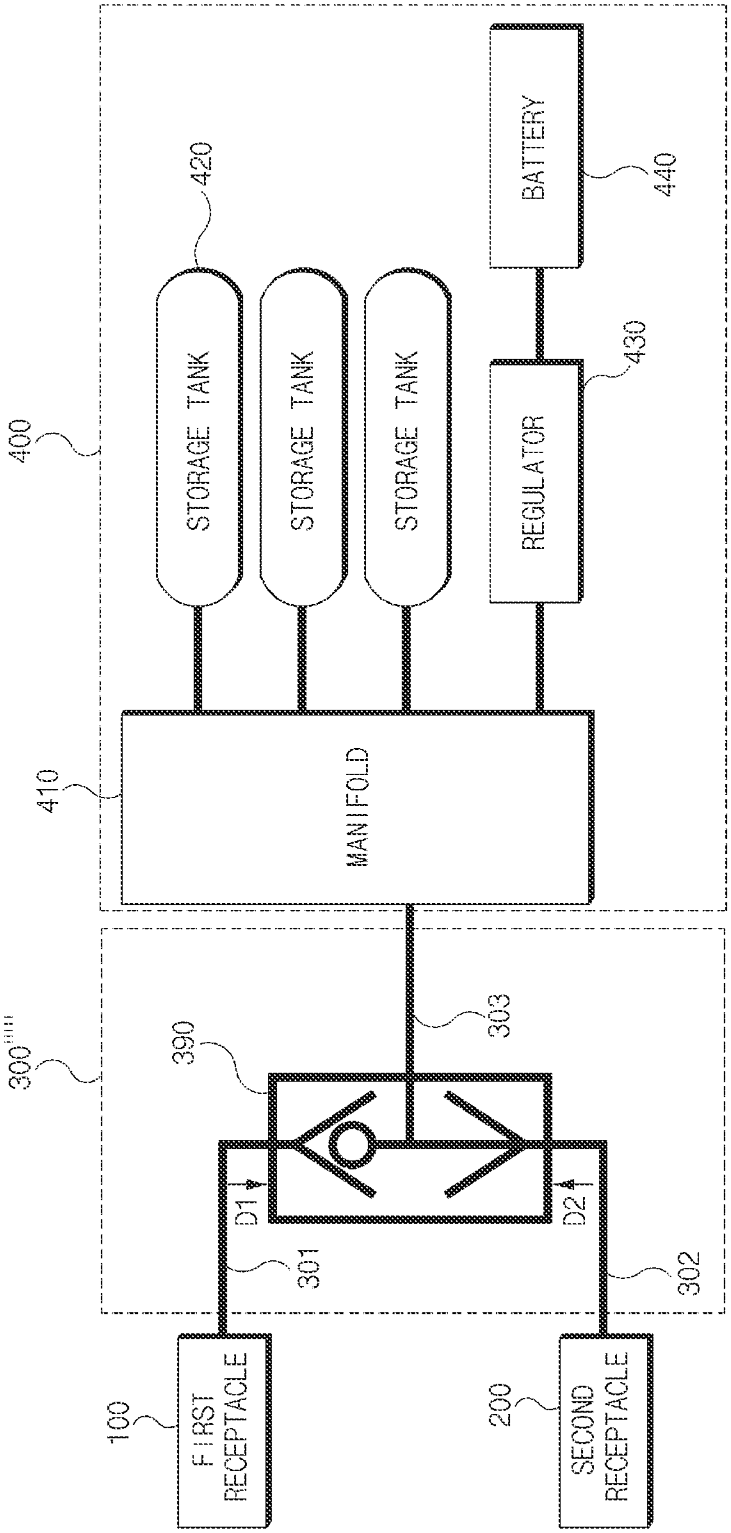
FIG. 6 is a view illustrating a fluid filling system for a vehicle according to a third embodiment of the present disclosure.

FIG. 6 is a view illustrating a fluid filling system for a vehicle according to a third embodiment of the present disclosure. Hereinafter, the fluid distributing apparatus 300'''' including a flow rate adjusting part according to the third embodiment of the present disclosure will be described with reference to FIG. 6. The same or corresponding configurations of the fluid distributing apparatus 300 including the flow rate adjusting part according to the first embodiment will be denoted by the same or corresponding reference numerals, and a detailed description thereof will be omitted.

The flow rate adjusting part of the fluid filling system for a vehicle according to the third embodiment may be a shuttle valve 390. Then, the discharge passage 303 may be a single passage. The shuttle valve 390 may be connected to an end of the first introduction passage 301 in the first direction D1 and an end of the second introduction passage 302 in the second direction D2. Then, the first direction D1 and the second direction D2 may be opposite to each other. The shuttle valve 390 may be formed of a material that is brittle to hydrogen.

Figure 7:
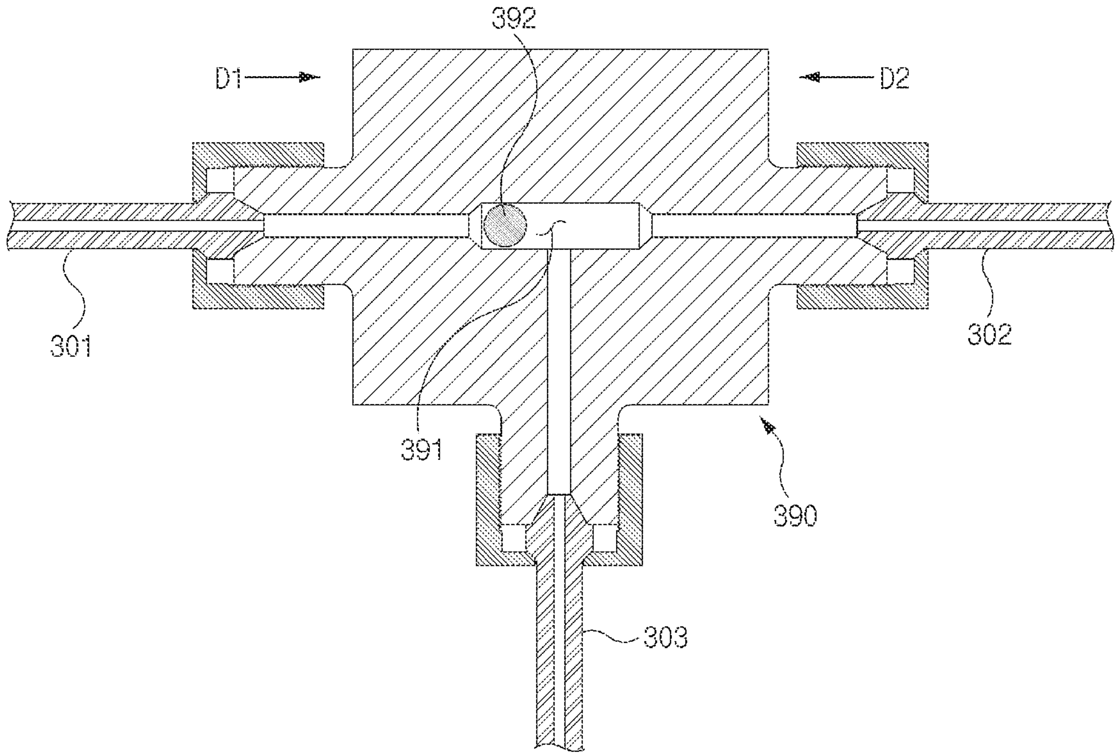
FIG. 7 is a cross-sectional view of a shuttle valve.

FIG. 7 is a cross-sectional view of the shuttle valve. Hereinafter, an operational principle of the shuttle valve 390 will be described in detail with reference to FIG. 7. The shuttle valve 390 may include a "T"-shaped internal passage 391 connected to the first introduction passage 301, the second introduction passage 302, and the discharge passage 303, and a ball 392 may be disposed in the internal passage 391.

Assume that the pressure of the first introduction passage 301 is a first pressure and the pressure of the second introduction passage 302 is a second pressure. When the first pressure is higher than the second pressure, the ball 392 in an interior of the shuttle valve 390 may be moved toward the second introduction passage 302 by the pressure and may close an entrance of the second introduction passage 302 of the internal passage 391 to prevent the second fluid from being introduced from the second receptacle 200. When the second pressure is higher than the first pressure, an opposite operation may be performed.

When the first pressure and the second pressure are the same, the ball 392 in the internal passage 391 may be moved to a center and may supply the first fluid and the second fluid to the fluid introducing part 400 through both of the first introduction passage 301 and the second introduction passage 302. This may mean that one of the first introduction passage 301 and the second introduction passage 302, which is the higher, may be communicated with the discharge passage 303.

In the third embodiment, because one of the fluids that are dually filled during the dual filling using the shuttle valve 390, a pressure of which is the higher, may be introduced into the fluid introducing part 400, and the first fluid and the second fluid may be simultaneously introduced into the fluid introducing part 400 when the pressures of the first fluid and the second fluid are the same, a filling efficiency may be increased.

For reference, the above description has been made above with reference to the dual filling, but it is apparent that the fluid distributing apparatus and the filling system for a vehicle according to embodiments of the present disclosure may be utilized even in single filling, in which the fluid is introduced into any one of the first receptacle 100 or the second receptacle 200.

According to embodiments of the present disclosure, because the flow rate of the fuel discharged toward the storage part after the fuel is introduced from the plurality of receptacles through the fluid distributing apparatus may be made uniform, a fuel filling efficiency may be improved.

The above description is a simple exemplary description of the technical spirits of embodiments of the present disclosure, and an ordinary person in the art, to which the present disclosure pertains, can make various corrections and modifications without deviating from the essential characteristics of embodiments of the present disclosure. Accordingly, the embodiments disclosed in the present disclosure are not for limiting the technical spirits of embodiments of the present disclosure but for describing them, and the scope of the technical spirits of embodiments of the present disclosure is not limited by the embodiments. The protection range of the present disclosure should be construed by the following claims, and all the technical spirits within the equivalent range should be construed as falling within the scope of the embodiments of the present disclosure.

What is claimed is:

1. A fluid filling system for a vehicle, the system comprising:
- a first receptacle;
- a second receptacle;
- a fluid distributing apparatus connected to the first receptacle and the second receptacle, the fluid distributing apparatus being configured to adjust a flow rate of a first fluid discharged from the first receptacle and a flow rate of a second fluid discharged from the second receptacle; and
- a fluid introducing part connected to the fluid distributing apparatus and configured to receive the first fluid and the second fluid discharged from the fluid distributing apparatus,
- wherein the fluid distributing apparatus comprises:
  - a first introduction passage connected to the first receptacle and through which the first fluid is introduced along a first direction;
  - a second introduction passage connected to the second receptacle and through which the second fluid is introduced along a second direction;
  - a discharge passage through which the first fluid introduced through the first introduction passage and the second fluid introduced through the second introduction passage are discharged; and
  - a flow rate adjusting part disposed between each of the first introduction passage and the second introduction passage and the discharge passage, the flow rate adjusting part being configured to adjust the flow rate of the first fluid or the second fluid, and
  - wherein the flow rate adjusting part comprises:
    - a first valve disposed in the first introduction passage and configured to adjust the flow rate of the first fluid;
    - a second valve disposed in the second introduction passage and configured to adjust the flow rate of the second fluid;
    - a connection passage connecting the first introduction passage and the second introduction passage;
    - a differential pressure measuring part disposed in the connection passage and configured to acquire a differential pressure of the first fluid and the second fluid in the connection passage; and
    - a controller electrically connected to the first valve and the second valve and configured to control opening and closing of the first valve and the second valve,
    - wherein the controller is configured to control opening degrees of the first valve and the second valve based on the differential pressure of the first fluid and the second fluid acquired by the differential pressure measuring part.

2. The system of claim 1, wherein the discharge passage comprises:
- a first discharge passage connected to the first introduction passage; and
- a second discharge passage connected to the second introduction passage.

3. The system of claim 2, wherein the controller is configured to control the opening degrees of the first valve and the second valve further based on a pressure of the first fluid in the first introduction passage and a pressure of the second fluid in the second introduction passage.

4. The system of claim 3, wherein the controller is configured to perform an operation of decreasing the opening degree of the first valve or an operation of increasing the opening degree of the second valve in a case in which the pressure of the first fluid is higher than the pressure of the second fluid.

5. The system of claim 3, wherein:

the flow rate adjusting part further comprises:

a first pressure measuring part disposed at one point in the first introduction passage and configured to measure a pressure in the first introduction passage; and a second pressure measuring part disposed at one point in the second introduction passage and configured to measure a pressure in the second introduction passage; and the controller is configured to control the opening degrees of the first valve and the second valve based on the pressure in the first introduction passage acquired by the first pressure measuring part and the pressure in the second introduction passage acquired by the second pressure measuring part.

6. The system of claim 3, wherein the first valve and the second valve are flow rate control valves.

7. The system of claim 3, wherein the first valve and the second valve are solenoid valves.

8. The system of claim 2, wherein the flow rate adjusting part further comprises:

a first check valve disposed between the first introduction passage and the first discharge passage and configured to prevent reverse flows of the first fluid; and a second check valve disposed between the second introduction passage and the second discharge passage and configured to prevent reverse flows of the second fluid.

9. The system of claim 1, wherein the flow rate adjusting part comprises a shuttle valve connected to an end of the first introduction passage in the first direction and an end of the second introduction passage in the second direction.

10. A fluid filling system for a vehicle, the system comprising:

a first receptacle;

a second receptacle;

a fluid distributing apparatus connected to the first receptacle and the second receptacle, the fluid distributing apparatus being configured to adjust a flow rate of a first fluid discharged from the first receptacle and a flow rate of a second fluid discharged from the second receptacle; and a fluid introducing part connected to the fluid distributing apparatus and configured to receive the first fluid and the second fluid discharged from the fluid distributing apparatus, wherein the fluid distributing apparatus comprises:

a first introduction passage connected to the first receptacle and through which the first fluid is introduced along a first direction;

a second introduction passage connected to the second receptacle and through which the second fluid is introduced along a second direction;

a discharge passage through which the first fluid introduced through the first introduction passage and the second fluid introduced through the second introduction passage are discharged; and a flow rate adjusting part disposed between each of the first introduction passage and the second introduction passage and the discharge passage, the flow rate adjusting part being configured to adjust the flow rate of the first fluid or the second fluid, and wherein the flow rate adjusting part comprises:

a first valve disposed in the first introduction passage and configured to adjust the flow rate of the first fluid;

a second valve disposed in the second introduction passage and configured to adjust the flow rate of the second fluid;

a connection passage connecting the first introduction passage and the second introduction passage;

a differential pressure measuring part disposed in the connection passage and configured to acquire a differential pressure of the first fluid and the second fluid in the connection passage; and a controller electrically connected to the first valve and the second valve and configured to control opening and closing of the first valve and the second valve, wherein the controller is configured to control opening degrees of the first valve and the second valve based on the differential pressure of the first fluid and the second fluid acquired by the differential pressure measuring part, wherein the fluid introducing part comprises:

a manifold connected to the fluid distributing apparatus; and a storage tank connected to the manifold.

11. The system of claim 10, wherein the fluid introducing part further comprises:

a regulator connected to the manifold and configured to reduce a pressure of a discharge fluid discharged from the manifold; and a battery connected to the regulator.

12. A fluid distributing apparatus, the apparatus comprising:

a first introduction passage, through which a first fluid is introduced in a first direction;

a second introduction passage, through which a second fluid is introduced in a second direction;

a discharge passage, through which the first fluid introduced through the first introduction passage and the second fluid introduced through the second introduction passage are discharged; and a flow rate adjusting part disposed between the discharge passage and each of the first introduction passage and the second introduction passage, the flow rate adjusting part being configured to adjust a flow rate of the first fluid, the second fluid, or both the first fluid and the second fluid; and wherein the flow rate adjusting part comprises:

a first valve disposed in the first introduction passage and configured to adjust the flow rate of the first fluid;

a second valve disposed in the second introduction passage and configured to adjust the flow rate of the second fluid;

a connection passage connecting the first introduction passage and the second introduction passage;

a differential pressure measuring part disposed in the connection passage and configured to acquire a differential pressure of the first fluid and the second fluid in the connection passage; and a controller electrically connected to the first valve and the second valve and configured to control opening and closing of the first valve and the second valve, wherein the controller is configured to control opening degrees of the first valve and the second valve based on the differential pressure of the first fluid and the second fluid acquired by the differential pressure measuring part.

13. The apparatus of claim 12, wherein the discharge passage comprises:

a first discharge passage connected to the first introduction passage; and a second discharge passage connected to the second introduction passage.

14. The apparatus of claim 13, wherein the controller is configured to control opening degrees of the first valve and the second valve based on a pressure of the first fluid in the first introduction passage and a pressure of the second fluid in the second introduction passage.

15. The apparatus of claim 14, wherein the controller is configured to:

perform an operation of decreasing the opening degree of the first valve or an operation of increasing the opening degree of the second valve in a case in which the pressure of the first fluid is higher than the pressure of the second fluid; and perform an operation of increasing the opening degree of the first valve or an operation of decreasing the opening degree of the second valve in a case in which the pressure of the first fluid is lower than the pressure of the second fluid.

* * * * *